United States Patent [19]

Takeuchi

[11] Patent Number: 5,174,242
[45] Date of Patent: Dec. 29, 1992

[54] FACILITY FOR RAISING CHICKENS

[75] Inventor: Masayuki Takeuchi, Tokushima, Japan

[73] Assignee: IP Co., Ltd., Tokushima, Japan

[21] Appl. No.: 813,796

[22] Filed: Dec. 26, 1991

[30] Foreign Application Priority Data

Apr. 3, 1991 [JP] Japan .................. 3-31129[U]
Apr. 3, 1991 [JP] Japan .................. 3-99454
Apr. 3, 1991 [JP] Japan .................. 3-99455

[51] Int. Cl.⁵ ............... A01K 31/04; A01K 31/18
[52] U.S. Cl. ........................ 119/22; 119/21
[58] Field of Search ............ 119/21, 22, 20, 19, 119/28, 16

[56] References Cited

U.S. PATENT DOCUMENTS

| | | | |
|---|---|---|---|
| 2,314,344 | 3/1943 | Cornell | 119/22 |
| 3,274,973 | 9/1966 | Woods et al. | 119/22 |
| 3,662,714 | 5/1972 | Poon | 119/22 |
| 3,978,819 | 9/1976 | Lovitt | 119/22 |
| 4,020,793 | 5/1977 | Morrison | 119/22 |
| 4,936,257 | 6/1990 | Kuhlmann | 119/22 |

FOREIGN PATENT DOCUMENTS 760914 8/1990 U.S.S.R. .................. 119/21

Primary Examiner—John G. Weiss
Attorney, Agent, or Firm—Wenderoth, Lind & Ponack

[57] ABSTRACT

A chicken raising facility includes a building, linked belt conveyors installed in a horizontal fashion within the building, and a driving mechanism to move the linked belts. The upper surfaces of the linked belts form compartments to raise chickens directly on the linked belts. The linked belts have floor panels connected together to form belts that bend freely. Compartment walls are arranged on the upper surfaces of the linked belts to allow a plurality of chickens to be raised in separate compartments.

7 Claims, 4 Drawing Sheets

FACILITY FOR RAISING CHICKENS

BACKGROUND OF THE INVENTION

This invention relates particularly to apparatus for raising eatable chickens.

It is extremely important to minimize disease in raising chickens. Diseases are spread because chickens eat feces in which bacteria have multiplied. Bacteria intrude into the chicken raising facility on the feet of humans entering and leaving. Bacteria which have entered the chicken raising facility get into the feces and are cultured in that medium. Diseases caused by parasitic bacteria in feces can be prevented by eliminating feces from the chicken raising facility. If a chicken eats feces immediately after excretion, it does not cause disease. This is because it takes a given number of days for the bacteria in feces to multiply. For this reason frequent removal of feces and maintenance of sanitary conditions within the chicken raising facility are important.

Approximately twenty eating chickens (for human consumption as meat) can be raised in one square meter. Twenty eating chickens consume approximately 140 Kg of feed in being raised to maturity. Consequently, a corresponding amount of feces accumulates on a dirt floor. Feces accumulates on the floor to a depth of tens of centimeters while the chickens are raised to maturity. Accumulated feces on a dirt floor cannot be removed until the chickens are removed. In this manner, large quantities of feces accumulated on a dirt floor provide an excellent environment for the generation of noxious gases and bacteria cultures, and are a source of bacterial infection.

To remove feces, a chicken raising facility with a feces removal belt provided under the floor has been developed. The floor in this facility is grated to allow feces to pass through it. By moving the removal belt provided under the floor, this configuration removes feces from under the floor.

It is a primary object of this invention to provide a facility for raising chickens in which the outbreak of diseases caused by feces is drastically reduced by maintaining the floor in a sanitary fashion. It is another primary object of this invention to provide a facility for raising chickens in which breast calluses (that can be caused by grated floors) can be prevented and high quality chickens can be raised. It is still another primary object of this invention to provide a facility for raising chickens in which the chickens can be easily removed after maturity.

SUMMARY OF THE INVENTION

In one preferred embodiment, the chicken raising facility of this invention comprises a building, linked belt conveyors installed in a horizontal fashion within the building, and a linked belt driving means.

The linked belts' upper surfaces form compartments such that chickens are raised directly above the linked belts. The linked belts have floor panels coupled together in the form of belts that can bend freely.

Compartment walls are mounted above the upper surfaces of the linked belts to separate the compartments allowing a plurality of chickens to be raised in separated compartments. In the preferred embodiment, compartment walls are attached to the building. Compartment walls fixed to the building prohibit the chickens from moving with the linked belts when they move. In a chicken raising facility with this configuration, the compartment walls are designed such that they can open and allow the chickens to be easily removed.

DETAILED DESCRIPTION OF THE INVENTION

The following describes an embodiment of the present invention based on illustrations. However, the following embodiment is only intended as a specific example illustrative of the technology involved in the chicken raising facility of this invention, and consequently, the chicken raising facility of this invention is in no way restricted to the materials, form, construction, or placement of structural parts described in the following embodiment. It is therefore to be understood that, in the scope of the appended claims, the invention may be practiced other than specifically described.

Figure 1:
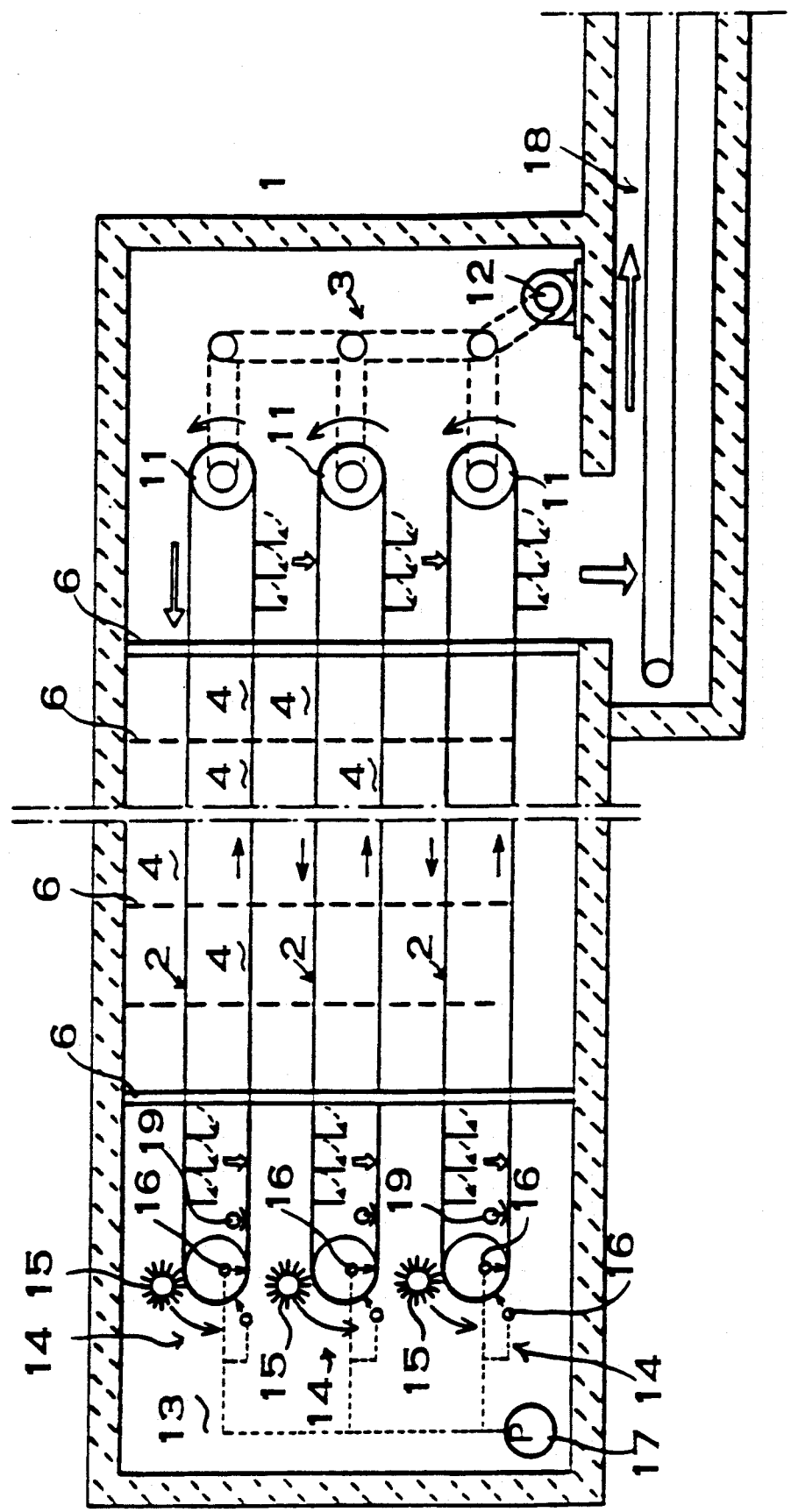
FIG. 1 is a diagrammatic cross-sectional drawing of a preferred embodiment of the chicken raising facility employing a feces removal means.

Turning to FIG. 1, the chicken raising facility shown comprises a building 1, linked belt conveyors 2 installed within the building 1, feces removal chambers 13 for removing feces from the linked belts 2, and a linked belt driving means 3 for moving the linked belts 2.

The linked belts 2 are installed in a horizontal fashion to allow chickens to be raised on them. To raise chickens efficiently, the upper surfaces of both the upper and lower paths of the linked belts 2 form chicken raising compartments 4. The chicken raising facility shown in FIG. 1 is provided with three levels of linked belts 2 which form six levels for raising chickens.

Figure 2:
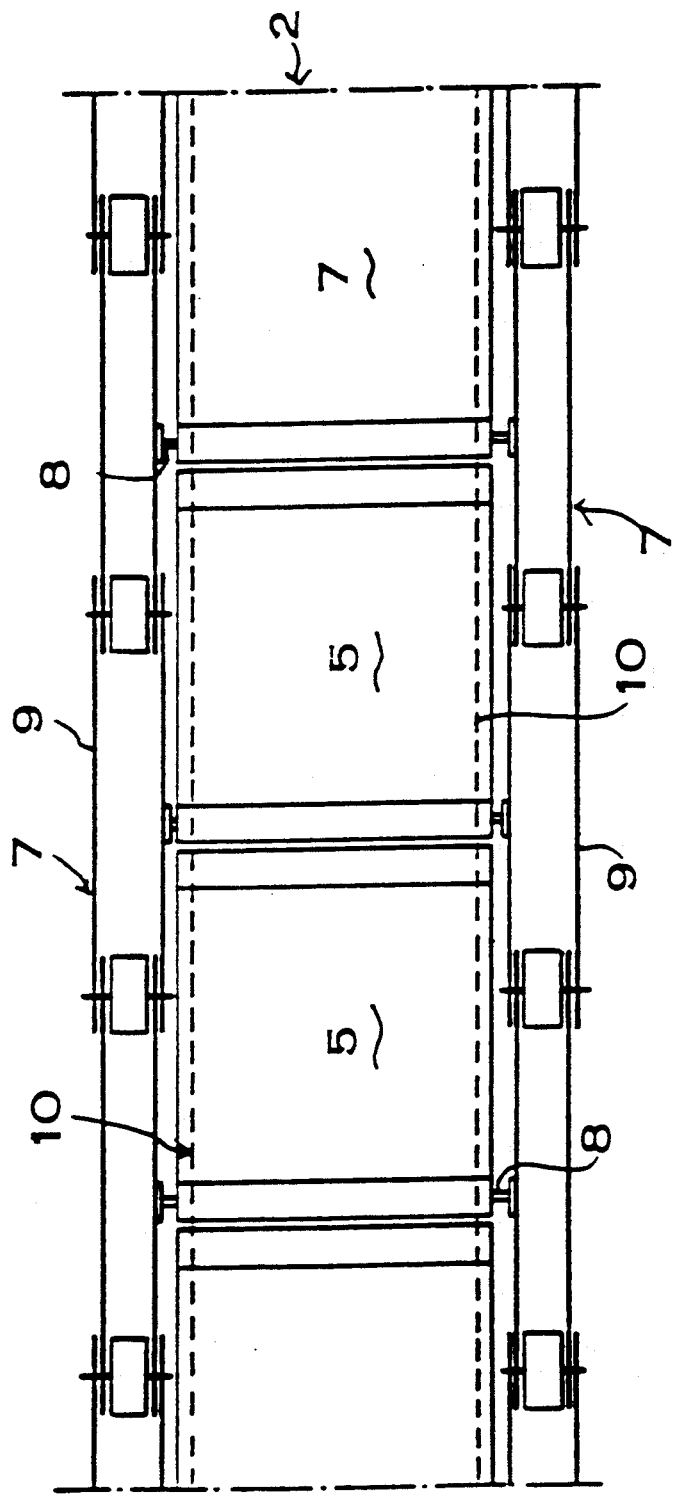
FIG. 2 is a plan view of one embodiment of a linked belt conveyor.
Figure 3:
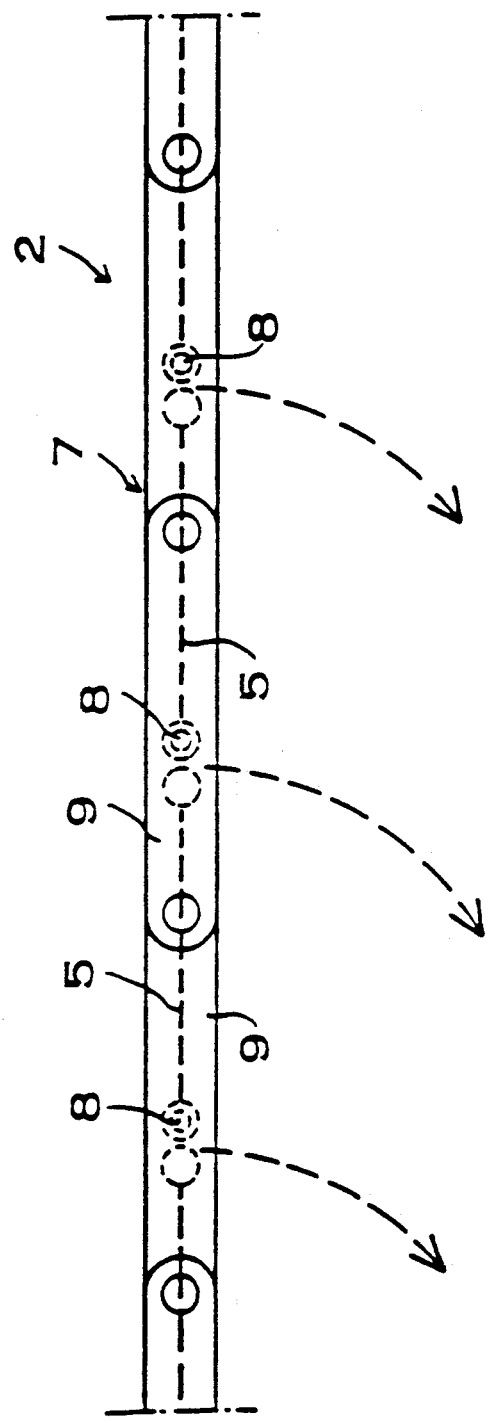
FIG. 3 is a side view of the linked belt conveyor of FIG. 2.

FIG. 2 and FIG. 3 show a plan view and a side view of a linked belt conveyor 2. The linked belts 2 shown in these and other figures comprise floor panels 5 and driving chains 7 which link the floor panels 5 together in belt form.

Figure 4:
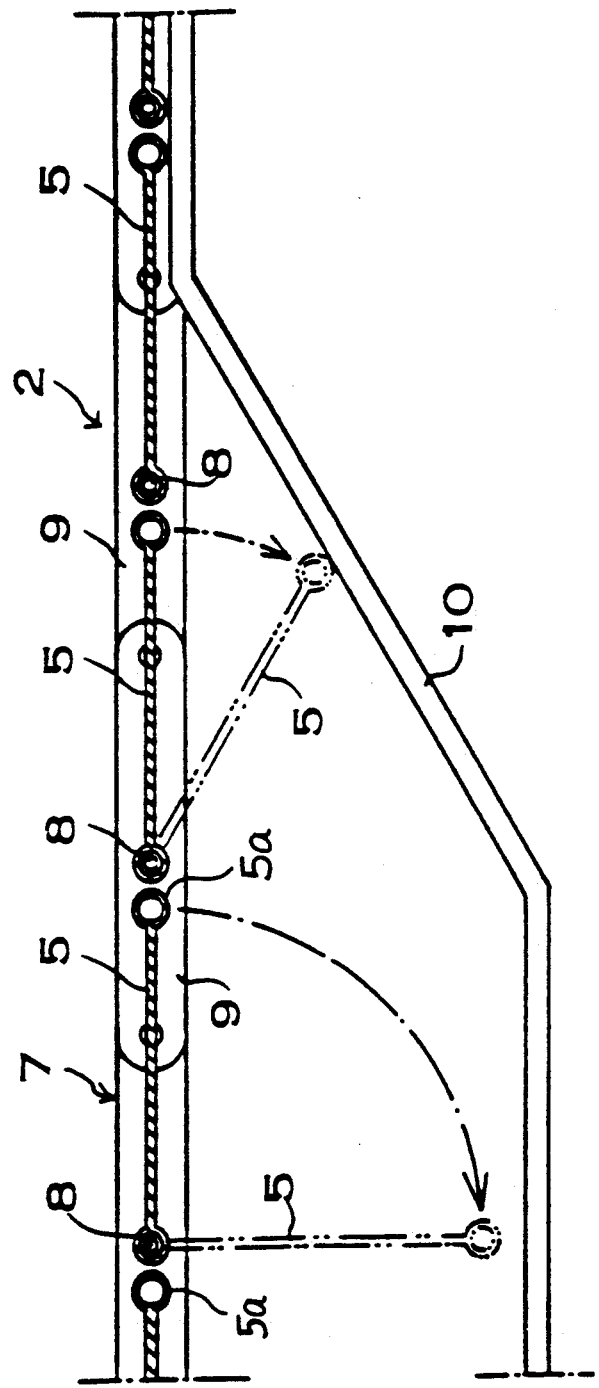
FIG. 4 is a cross-sectional side view of the linked belt conveyor of FIGS. 2 and 3.

Each floor panel 5 can be inclined from a horizontal position to vertical position around a pivot point at one end (the left end in the figures). As shown in FIG. 4, the cross-section of each floor panel 5 is such that both ends have cylindrical shapes 5a forming reinforcement ribs. Floor panels 5 having this form are reinforced by the ribs at both ends and manifest sufficient bending strength. A pivot rod 8 is inserted through the cylindrical rib at the left end of each floor panel 5. Both ends of the pivot rods 8 are attached to the inside of links 9 that form the chains 7. With this structure, the pivot rods 8 insert through the floor panels 5 in a manner allowing free rotation. However, although it is not illustrated, the pivot rods 8 may alternatively be fixed to the floor panels 5 and connect with the links 9 in a manner allowing free rotation.

In the chicken raising facility shown in FIG. 1, when the chickens have reached maturity, the linked belts 2 are put in motion and chickens are removed from the lowest belt level. In order to move chickens from upper level belts 2 to lower level belts 2, the linked belts 2 are configured to drop the chickens at their end regions.

Specifically, the floor panels 5 are configured to open when moved to the end regions of the linked belts 2.

When the linked belts 2 are moved slowly with the compartment walls 6 in an unopened state, feces on the linked belts 2 can be removed without transporting the chickens. To make this practical, the linked belts 2 are moved slowly, for example, making one full cycle in a day, and the linked belts 2 coming into the feces removal chambers 13 are continuously washed and disinfected with hot air blast. In this case the linked belts 2 are washed every day. By cycling the linked belts 2 once every two days, they can be washed and disinfected once every other day.

The under surfaces of the floor panels 5 of the linked belts 2 are supported to maintain them in a horizontal fashion. If the under surfaces of the floor panels 5 are not supported, they incline to vertical under their own weight. Horizontal guides 10 are provided under the linked belts 2 to support the undersides of the floor panels 5. Horizontal guides 10 maintain the floor panels 5 horizontal by having them slide along the top of the horizontal guides 10. Horizontal guides 10 are provided over a length where the floor panels 5 are held horizontal, in other words over a length excluding the end regions of the linked belts 2. When the floor panels 5 move over a region where the horizontal guides 10 descend, the floor panels 5 drop to vertical under their own weight, thereby dropping any chickens riding above. The end regions of the chicken raising facility, where chickens can be dropped to a lower level, are maintained as dark rooms to prevent the chickens from struggling when being dropped.

Feces removal chambers 13 are provided at both ends of the building shown in FIG. 1 for removing feces collected on the linked belts 2. Feces removal means 14 are installed within the feces removal chambers 13. The feces removal means 14 comprise rotating brushes 15 for scraping feces off the linked belts 2, cleaning nozzles 16 for spraying cleaning fluid, cleaning fluid pumps 17 for supplying cleaning fluid under pressure to the cleaning nozzles 16, and hot air drying and disinfecting means 19 for drying the floor panels 5 and disinfecting the linked belts 2 with hot air blasts.

The rotating brushes 15 remove feces from the linked belts 2. This occurs after chickens are dropped to a lower level for mature chicken removal. The rotating brushes 15 are mounted parallel to the rotating sprocket axles of the linked belts 2 in a fashion allowing free rotation and allowing contact between the brush tips and the linked belts 2. The ends of the rotating brushes 15 connect to motors (not illustrated) which rotate the brushes.

The cleaning nozzles 16 clean the linked belts 2 by spraying cleaning fluid on them after the rotating brushes 15 have removed the feces. The cleaning nozzles 16 spray cleaning fluid on both sides of the linked belts 2. Consequently, cleaning nozzles 16 are mounted to point at the linked belts 2 both to spray cleaning fluid on the outside of the linked belts 2 and to spray cleaning fluid on the inside of the linked belts 2. The cleaning fluid washes feces off of the linked belts 2, and further a disinfectant fluid is used.

The cleaning fluid pumps 17 pressurize the cleaning fluid and supply it to the cleaning nozzles 16. The output sides of the cleaning fluid pumps 17 are connected to the individual cleaning nozzles 16 causing cleaning fluid ejection from all cleaning nozzles 16.

The linked belts 2 are driven slowly by the linked belt driving means 3. The linked belt driving means 3 drives the sprockets 11 which mesh with the chains 7 of the linked belts 2. Specifically, the axles of the sprockets 11 are connected to a reduction motor 12 through driving chains. The linked belt driving means 3 moves the linked belts 2 slowly.

A transport system 18 is provided under the bottom level of continuous linked belts for the purpose of removing chickens from the facility. The transport system 18 carries matured chickens away from the facility to the next processing step. The transport system 18 uses a flexible conveyor belt with the outside covered with opaque material to keep the conveyor path dark. A flexible conveyor belt installed within an underground tunnel provides an ideal transport system 18.

In the chicken raising facility having a feces removal means 14 as shown in FIG. 1, the compartment walls 6 are mounted to the building 1. The compartment walls 6 that divide the linked belts 2 are mounted to the building in a manner allowing them to rotate in the vertical plane. When in the vertical position, the compartment walls 6 divide the linked belts 2 into a plurality of compartments 4. When chickens are to be transported on the linked belts 2, the compartment walls 6 are rotated to the horizontal position. In the horizontal position, the compartment walls 6 do not divide the linked belts 2 into compartments, and chickens can be moved along with the linked belts 2.

Pivot rods (not illustrated) are fixed to the upper ends of the compartment walls 6. Both ends of the pivot rods are mounted to the building 1 through bearings. Further, although not illustrated, actuating cylinders are connected to the pivot rods to rotate the compartment walls 6 ninety degrees.

The size of the chicken raising compartments 4 can be adjusted by adjusting the spacing of the compartment walls 6. By making the wall 6 spacing wider, the compartments 4 can be made larger. The wall 6 spacing is adjusted, for example, to be from 50 cm to one or several meters.

The compartment walls of this invention, however, are not specifically restricted to configurations which attach to the building. Further, this invention is not limited to the linked belt configuration described previously. For example, although not illustrated, flexible conveyor belts may be used in place of the linked belts 2.

The chicken raising facility shown in the figures does not require a grated floor configuration to allow feces to pass through as in previous facilities. This is because of the reliable system for removing feces on the linked belts 2. Specifically, by movement of the linked belts into the feces removal chambers provided at the ends of the building, feces on the upper surfaces can be simply and cleanly removed.

A chicken raising facility with this construction has the feature that feces on the floor where chickens are raised can be cleanly removed. This is because the floor panels which form the floors of the chicken raising chambers are moved outside the chicken raising chambers where feces can be cleanly removed and, if necessary, the panels can be washed. Therefore, this invention has the feature that an extremely sanitary environment can be maintained within the chicken raising chambers, and chicken diseases caused by the culture of parasitic bacteria in feces can be drastically reduced.

Further, the chicken raising facility of this invention has the feature that high quality chickens can be raised in it. This results from attainment of a germ free environment by effective removal of feces collected on the floor. It also results from a floor structure which is similar to a natural dirt floor with no need for gratings. Without the need for a grated floor, it is possible to prevent breast calluses by preventing injury to the chickens' breasts. This is because breast calluses develop from bacteria entering wounds on the chicken's breast. An ideal environment for raising chickens is thereby attained which is germ free and is similar to a natural dirt floor environment.

Still further, the chicken raising facility of this invention has the feature that chickens can be easily taken out of the facility. Since the floors of the chicken raising compartments are moved as integrated linked belts instead of moving a simple feces removal conveyor belt, the chickens can be collected at one end of the linked belts and simply removed if necessary.

We claim:

1. A chicken raising facility comprising:
   a building;
   at least one endless conveyor mounted in said building and including a pair of substantially horizontally disposed endless elements and a plurality of floor panels pivotably mounted to said endless elements for pivotal movement between respective horizontal positions in which said floor panels are adapted to support chickens and vertical positions which allow chickens to drop to a lower level, said at least one conveyor having upper and lower runs;
   driving means for driving said endless elements of said at least one conveyor such that said floor panels are moved along a predetermined path;
   guide means for guiding said floor panels during movement thereof along said predetermined path such that said floor panels are maintained in said horizontal positions while being moved along predetermined portions of said predetermined path, and are caused to pivot to said vertical positions at predetermined locations along said predetermined path; and
   a plurality of compartment dividing walls mounted above each of said upper and lower runs of said at least one conveyor for defining, together with said floor panels when in said horizontal positions, a plurality of chicken raising compartments along said upper and lower runs of said at least one conveyor.

2. A chicken raising facility as recited in claim 1, wherein
   said at least one conveyor comprises a plurality of vertically spaced apart substantially horizontal conveyors.

3. A chicken raising facility as recited in claim 1, wherein
   said endless elements comprise endless chains; and
   pivot rods are mounted to said chains and to said floor panels for pivotably mounting said floor panels to said chains.

4. A chicken raising facility as recited in claim 3, wherein
   said at least one conveyor further includes sprockets, said chains being trained about said sprockets.

5. A chicken raising facility as recited in claim 1, wherein
   said guide means comprises horizontal guides mounted beneath each of said upper and lower runs of said at least one conveyor along said predetermined portions of said predetermined path, said floor panels being slidable along said horizontal guides.

6. A chicken raising facility as recited in claim 1, wherein
   said predetermined locations at which said floor panels are caused to pivot into said vertical positions are defined at ends of said conveyor.

7. A chicken raising facility as recited in claim 1, further comprising
   feces removal means, mounted adjacent at least one end of said at least one conveyor for removing feces from upper surfaces of said upper and lower runs of said conveyor.

* * * * *